United States Patent
Farren et al.

(10) Patent No.: US 11,319,122 B2
(45) Date of Patent: May 3, 2022

(54) CONTAINER STOPPER FOR HIGH PIERCE COUNT APPLICATIONS

(71) Applicant: Instrumentation Laboratory Company, Bedford, MA (US)

(72) Inventors: Christopher Francis Farren, Wilmington, MA (US); Joshua A. Shreve, Acton, MA (US)

(73) Assignee: INSTRUMENTATION LABORATORY COMPANY, Bedford, MA (US)

( * ) Notice: Subject to any disclaimer, the term of this patent is extended or adjusted under 35 U.S.C. 154(b) by 17 days.

(21) Appl. No.: 16/732,987

(22) Filed: Jan. 2, 2020

(65) Prior Publication Data

US 2020/0216235 A1 Jul. 9, 2020

Related U.S. Application Data (60) Provisional application No. 62/788,378, filed on Jan. 4, 2019.

(51) Int. Cl.
*B65D 51/00* (2006.01)
*B65D 39/00* (2006.01)

(52) U.S. Cl.
CPC ....... *B65D 51/002* (2013.01); *B65D 39/0052* (2013.01)

(58) Field of Classification Search
CPC .............. B65D 51/002; B65D 39/0052; G01N 2030/185; G01N 35/1079; B01L 3/50825
USPC ........................................................ 215/247
See application file for complete search history.

(56) References Cited

U.S. PATENT DOCUMENTS

| | | | | |
|---|---|---|---|---|
| 2,848,130 A | * | 8/1958 | Jesnig ................. | B65D 51/002 215/45 |
| 3,480,171 A | * | 11/1969 | Le Roy ............... | B65D 51/002 215/251 |
| 4,366,912 A | * | 1/1983 | Matukura ........... | B65D 51/002 215/247 |

(Continued)

FOREIGN PATENT DOCUMENTS

EP 0564037 A1 10/1993

OTHER PUBLICATIONS

International Search Report and Written Opinion for International Application No. PCT/US2020/012032, dated Mar. 19, 2020, 11 pages.

(Continued)

*Primary Examiner* — Ernesto A Grano
(74) *Attorney, Agent, or Firm* — Burns & Levinson LLP (57) ABSTRACT

A pierceable self-resealing stopper for a container is disclosed. The disclosed stopper is suitable for sealing a container containing reagents for use in a high-throughput analysis system in which reagents in the container are accessed by an aspirator probe piercing the stopper. The stopper is configured for being pierced and resealing itself a large number of times without degradation of the stopper by coring or fragmentation, for example. A set of protrusions extending from a top surface of the stopper is depressed to stretch a thin diaphragm area between the protrusions prior to and during insertion of the probe. After extraction of the probe, the protrusions are allowed to return to a relaxed state, which discontinues stretching of the diaphragm area and reseals the container.

20 Claims, 7 Drawing Sheets

(56) References Cited

U.S. PATENT DOCUMENTS

| | | | | |
|---|---|---|---|---|
| 4,545,497 A | * | 10/1985 | Martha, Jr. | B65D 51/002 215/253 |
| 4,872,572 A | * | 10/1989 | Schrooten | B65D 39/0023 215/307 |
| 5,125,921 A | * | 6/1992 | Duschek | B65D 51/002 215/247 |
| 5,279,606 A | * | 1/1994 | Haber | A61J 1/2093 215/364 |
| 5,484,566 A | * | 1/1996 | Gabbard | B29C 43/146 264/250 |
| 5,817,082 A | | 10/1998 | Niedospial, Jr. et al. | |
| 5,819,964 A | * | 10/1998 | Grimard | B65D 51/241 215/249 |
| 5,947,274 A | * | 9/1999 | Taskis | B65D 51/30 206/204 |
| 6,223,918 B1 | * | 5/2001 | Browne | B65D 51/002 215/249 |
| 6,286,699 B1 | * | 9/2001 | Sudo | B65D 39/00 215/247 |
| 6,322,739 B1 | * | 11/2001 | Andersson | B29C 35/16 264/250 |
| 2001/0002013 A1 | * | 5/2001 | Claessens | B65D 51/002 215/249 |
| 2002/0142124 A1 | * | 10/2002 | Muraki | B65D 51/002 428/64.1 |
| 2006/0191594 A1 | * | 8/2006 | Py | B29C 65/18 141/329 |
| 2009/0166311 A1 | * | 7/2009 | Claessens | B65D 41/28 215/203 |
| 2011/0266249 A1 | * | 11/2011 | Kakutani | B65D 51/002 215/364 |
| 2012/0067888 A1 | * | 3/2012 | Kawachi | A61J 1/1425 220/233 |
| 2013/0119011 A1 | * | 5/2013 | Kawachi | B65D 39/00 215/355 |
| 2013/0270271 A1 | * | 10/2013 | Asai | B65D 39/007 220/277 |
| 2014/0008321 A1 | * | 1/2014 | Lentz | B01L 3/50825 215/257 |
| 2015/0112296 A1 | * | 4/2015 | Ishiwata | A61J 1/1443 604/406 |
| 2016/0200488 A1 | * | 7/2016 | Friedrich | B65D 41/44 215/249 |
| 2017/0173266 A1 | * | 6/2017 | Ashmead | A61M 5/31513 |

OTHER PUBLICATIONS

International Preliminary Report on Patentability dated Jul. 15, 2021 for International Application No. PCT/US2020/012032, 7 pgs.
Communication pursuant to Rules 161(1) & 162 for European Application No. 20703320.0, dated Aug. 11, 2021, (3 pages).
International Search Report for International Application No. PCT/US2020/012032, dated Jul. 9, 2021, (3 pages).
Written Opinion for International Application No. PCT/US2020/012032, dated Jul. 9, 2021, (5 pages).
Response to Communication pursuant to Rules 161(1) & 162 for European Application No. 20703326.0, filed Oct. 25, 2021, (7 pages).

* cited by examiner

CONTAINER STOPPER FOR HIGH PIERCE COUNT APPLICATIONS

CROSS REFERENCE TO RELATED APPLICATIONS

This application claims priority to U.S. provisional patent application No. 62/788,378 entitled "Container Stopper For High Pierce Count Applications" which was filed on Jan. 4, 2019 and which is incorporated by reference herein in its entirety

BACKGROUND

Some automated blood analyzers mix different reagents with blood samples or other fluids under test as part of their analysis protocols. High throughput analyzers generally store a relatively large amount of the various reagents in containers that are repeatedly accessed by needle type aspirator probes to obtain the needed amounts of reagents for testing. The reagent containers may have openings that are enclosed by an elastomeric stopper. The elastomeric stopper can be pierced by a needle-type aspirator probe and substantially recloses itself to seal the container when the aspirator probe is removed.

In currently available high-throughput automated analyzers, a reagent container stopper may be subject to as many as 750 piercings by aspirator probes before the reagent container's contents are exhausted. The large number of piercings can cause fragmentation and coring of the container stopper. Such fragmenting and coring of the container stopper can result in inadequate sealing of the reagent container and/or contamination of the reagents which can and lead to inaccurate analysis results and other system level reliability problems, for example.

SUMMARY

Aspect of the present disclosure include a resealing reagent container stopper that can be subjected to high pierce counts with reduced susceptibility to coring or fragmentation. The disclosed stopper is suitable for use in packaging of reagents which contain a high volume of reagents for high-throughput analysis systems.

The disclosed stopper has a thin diaphragm, an aggressive undercut core, and compression protrusion features on the top of the stopper. Together, these features aid in stretching the diaphragm for ease of piercing and reduced coring and fragmentation.

The disclosed stopper permits the use of large containers in which a stopper must be capable of a large number of piercings without suffering coring and fragmentation. The amount of force required to pierce and slide through the disclosed stopper with a standard medical grade piercing cannula is drastically reduced compared to previously used stoppers.

BRIEF DESCRIPTION OF THE DRAWINGS

These embodiments and other aspects of this invention will be readily apparent from the detailed description below and the appended drawings, which are meant to illustrate and not to limit the invention. The patent or application file contains at least one drawing executed in color. Copies of this patent or patent application publication with color drawing(s) will be provided by the Office upon request and payment of the necessary fee.

DETALED DESCRIPTION

Aspects and embodiments of the present disclosure are described herein with reference to the accompanying drawings, wherein like reference characters designate like or corresponding parts throughout the several views.

Aspects of the present disclosure include a method and apparatus for providing resealable access to a reagent container suitable for use in high-throughput automated analyzers. An improved container stopper is disclosed which substantially reduces the insertion force required by an aspirator probe to pierce the stopper compared to previously known container stoppers. The disclosed container stopper is designed and configured to be subject to a high number of piercings without fragmenting or coring of the container stopper.

Figures 1, 2:
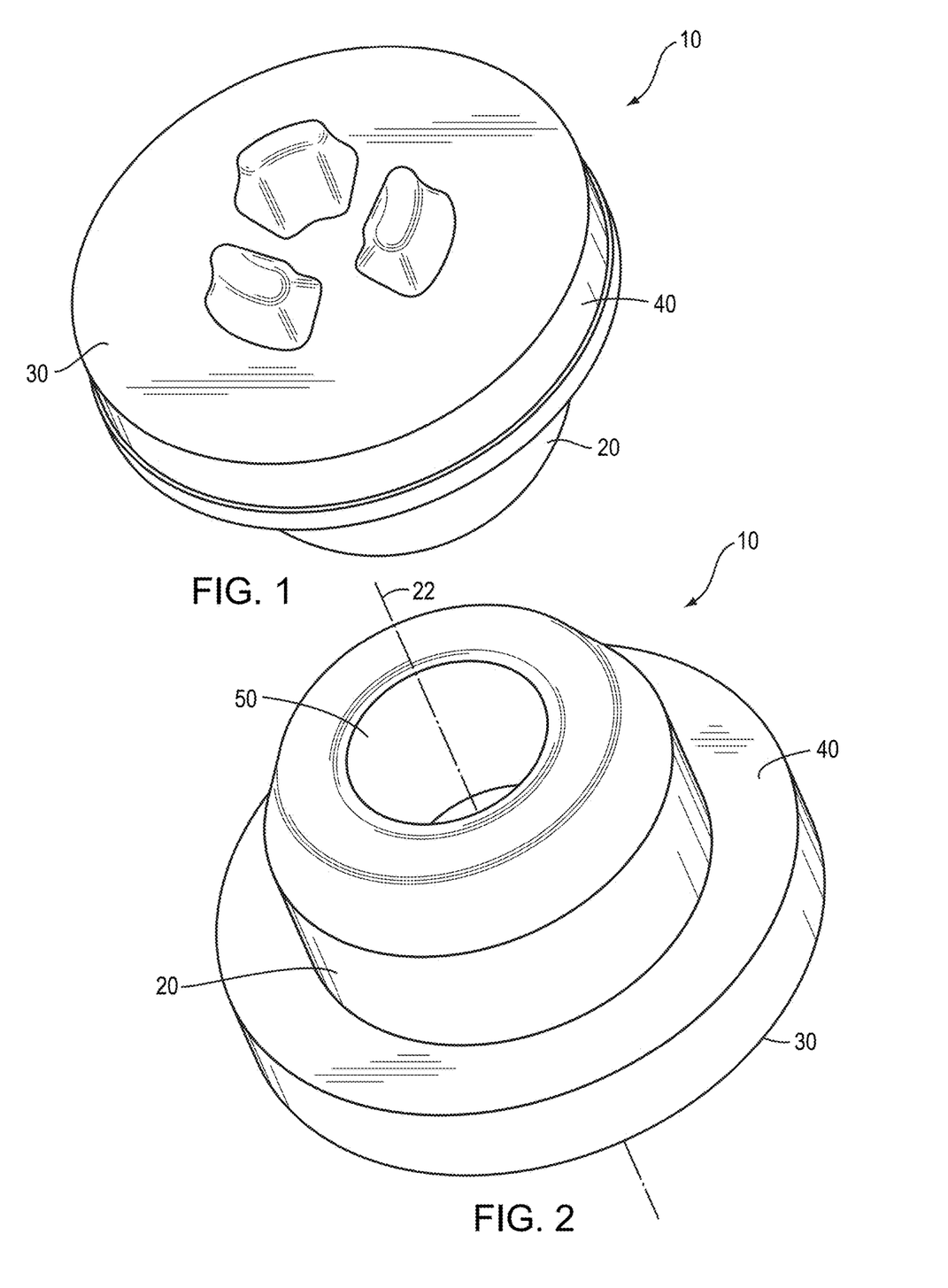
FIG. 1 shows a top view of a container stopper according to an aspect of the present disclosure.
FIG. 2 shows a bottom view of the container stopper shown in FIG. 1.
Figure 3:
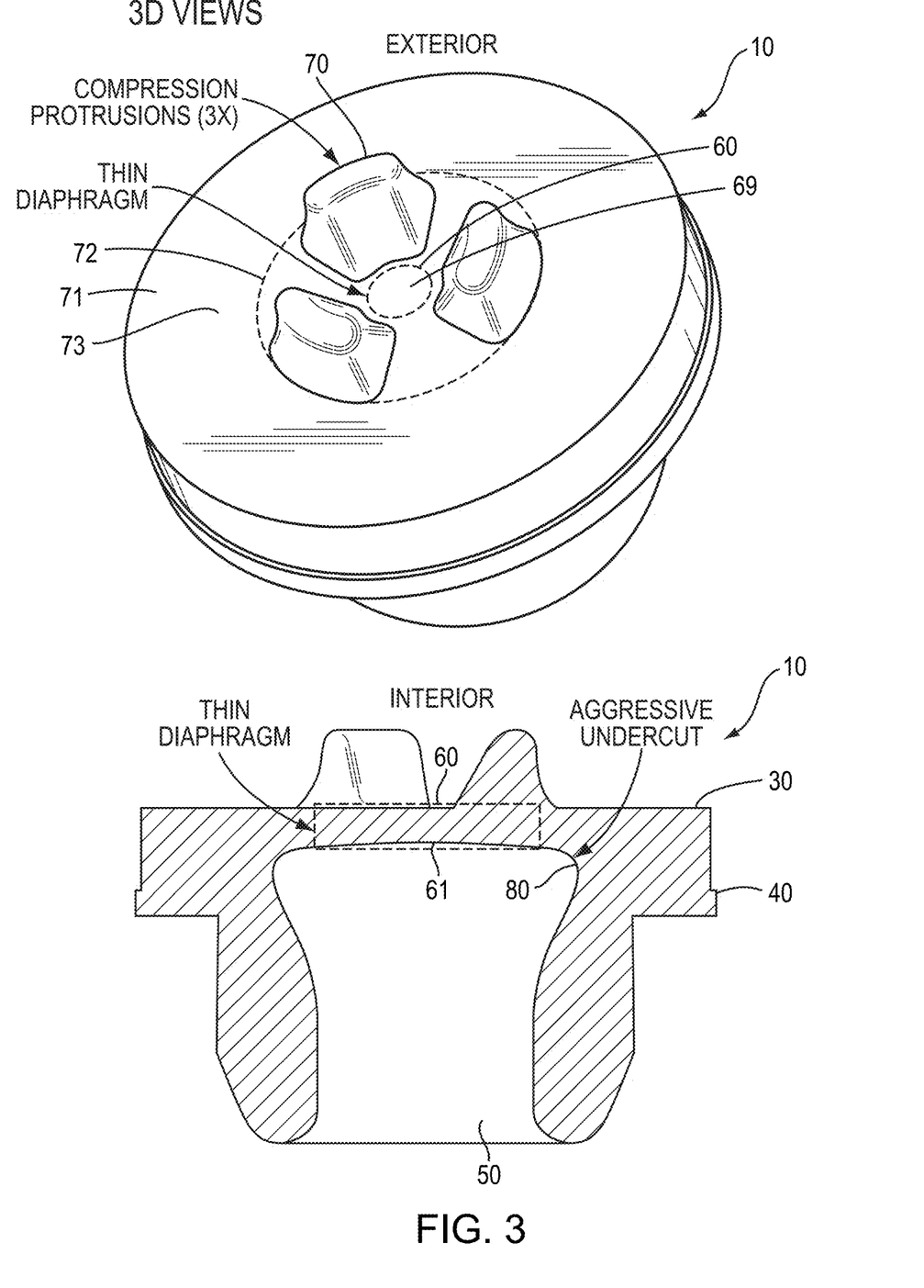
FIG. 3 shows a cross-sectional side view of the container stopper shown in FIGS. 1 and 2.

FIG. 1 shows a top view of a container stopper according to an illustrative embodiment of the present disclosure. FIG. 2 shows a bottom view of the container stopper shown in FIG. 1. FIG. 3 shows a cross-sectional side view of the container stopper shown in FIGS. 1 and 2.

Referring to FIGS. 1 and 2, a pierceable stopper 10 for sealing a container opening includes a hollow plug portion 20 defining a central axis 22, and a disk portion 30 covering the hollow plug portion 20. The disk portion 30 is concentrically arranged with the hollow plug portion 20 about the central axis and defines a flange 40 extending radially beyond an outside diameter of the hollow plug portion 20. According to an aspect of the present disclosure, the stopper 10 also includes an internal cavity 50 of the hollow plug portion 20. Referring to FIG. 3, the internal cavity 50 intersects the disk portion 30 such that the disk portion 30 includes a reduced thickness portion 60 over the internal cavity 50.

A central area 69 of the disk portion 30 defines a pierceable membrane 61 over the reduced thickness portion 60. According to another aspect of the present disclosure, a plurality of protrusions 70 extends from a top surface 71 of the disk portion 30 in a first radial zone 72 of the top surface 71 over the reduced thickness portion 60 and in a direction opposite the internal cavity 50. The first radial zone 72 is outside of and concentric with the central area 69 of the disk portion 30. A second radial zone 73 of the top surface 71 defines a planar ring area outside of the first radial zone 72.

According to an aspect of the present disclosure the internal cavity 50 includes an undercut portion 80 extending radially into the flange portion 40.

In an illustrative embodiment, the plurality of protrusions 70 are substantially equidistantly placed in conjunction with the pierceable membrane 61 and the undercut portion 80. The pierceable membrane 61 defines an elastic diaphragm integrally attached to and movable with each of the plurality of protrusions 70.

In an illustrative embodiment, each of the plurality of protrusions 70 has an identical geometry and is spaced substantially equidistant from each adjacent protrusion within the first radial zone 72 of the top surface 71. In the illustrative embodiment, each of the protrusions 70 includes a ramped inner surface and a substantially vertical outer surface, for example.

According to an aspect of the present disclosure, the plurality of protrusions 70 when compressed by an external force are configured to reduce the external piercing forces applied by an aspirator probe on the stopper 10.

In an illustrative embodiment, the hollow plug portion 20 has a compressible exterior surface. In an illustrative embodiment, the pierceable stopper 10 may be made from a bromobutyl material, for example. The pierceable stopper 10 may also include a siliconized outer surface.

Figure 4A:
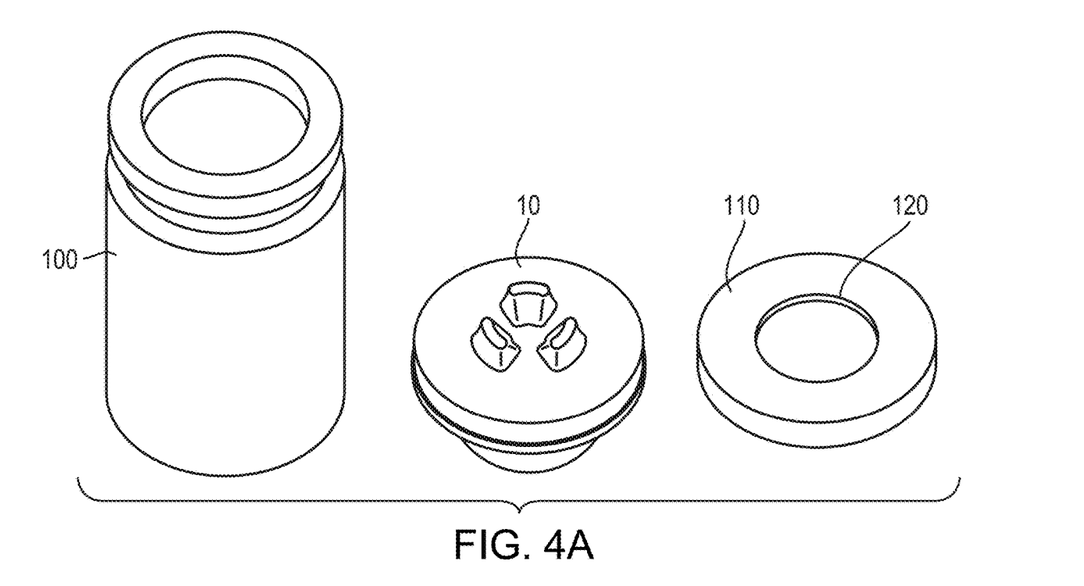
FIGS. 4A-4C show an example of a reagent container that may be resealably closed by the disclosed stopper, and a separate cover member that can be installed over the stopper after the stopper is installed on the reagent container according to an aspect of the present disclosure.
Figure 4B:
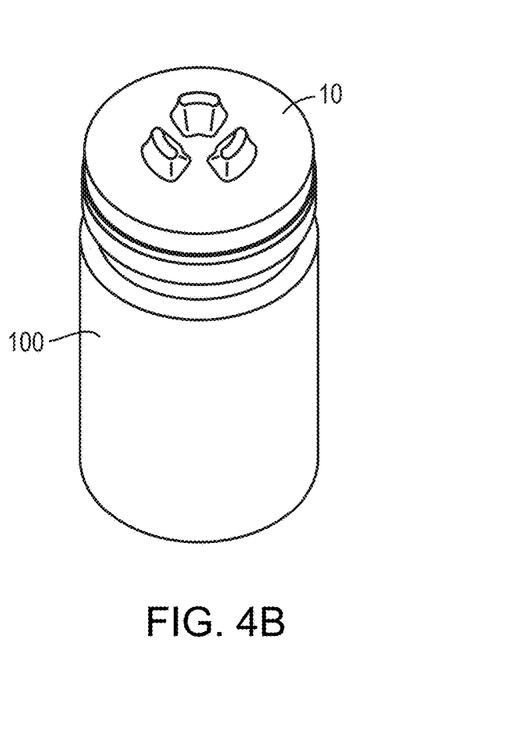
Figure 4C:
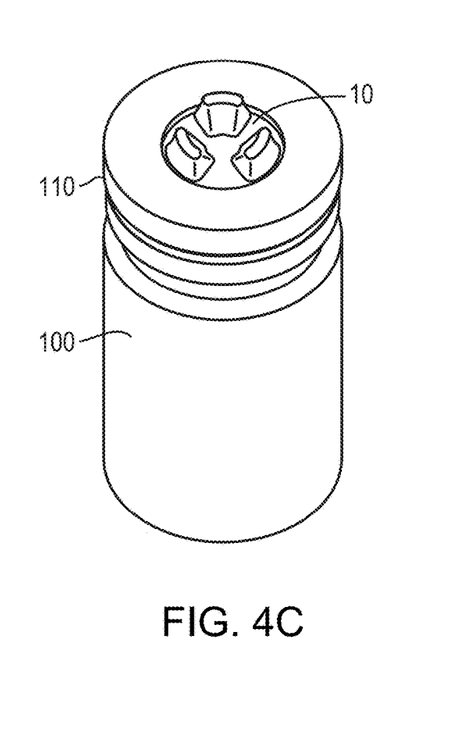

FIG. 4A shows an example of a reagent container 100 that may be resealably closed by the disclosed stopper 10, and a separate cover member 110 that can be installed over the stopper 10 after the stopper 10 is installed on the reagent container 100. FIG. 4B shows the stopper 10 installed on the reagent container 100. FIG. 4C shows the cover member 110 installed over the stopper 10 while the stopper is installed on the container 100.

The cover member 110 includes a central aperture 120 sized such that the cover member 110 covers the second radial zone 73 of the top surface 71 of the stopper 10, but does not cover the first radial zone 72 or the central area 69 of the top surface 71 of the stopper 10. The central aperture 120 allows the plurality of protrusions 70 to extend through the cover member 110.

Figure 5:
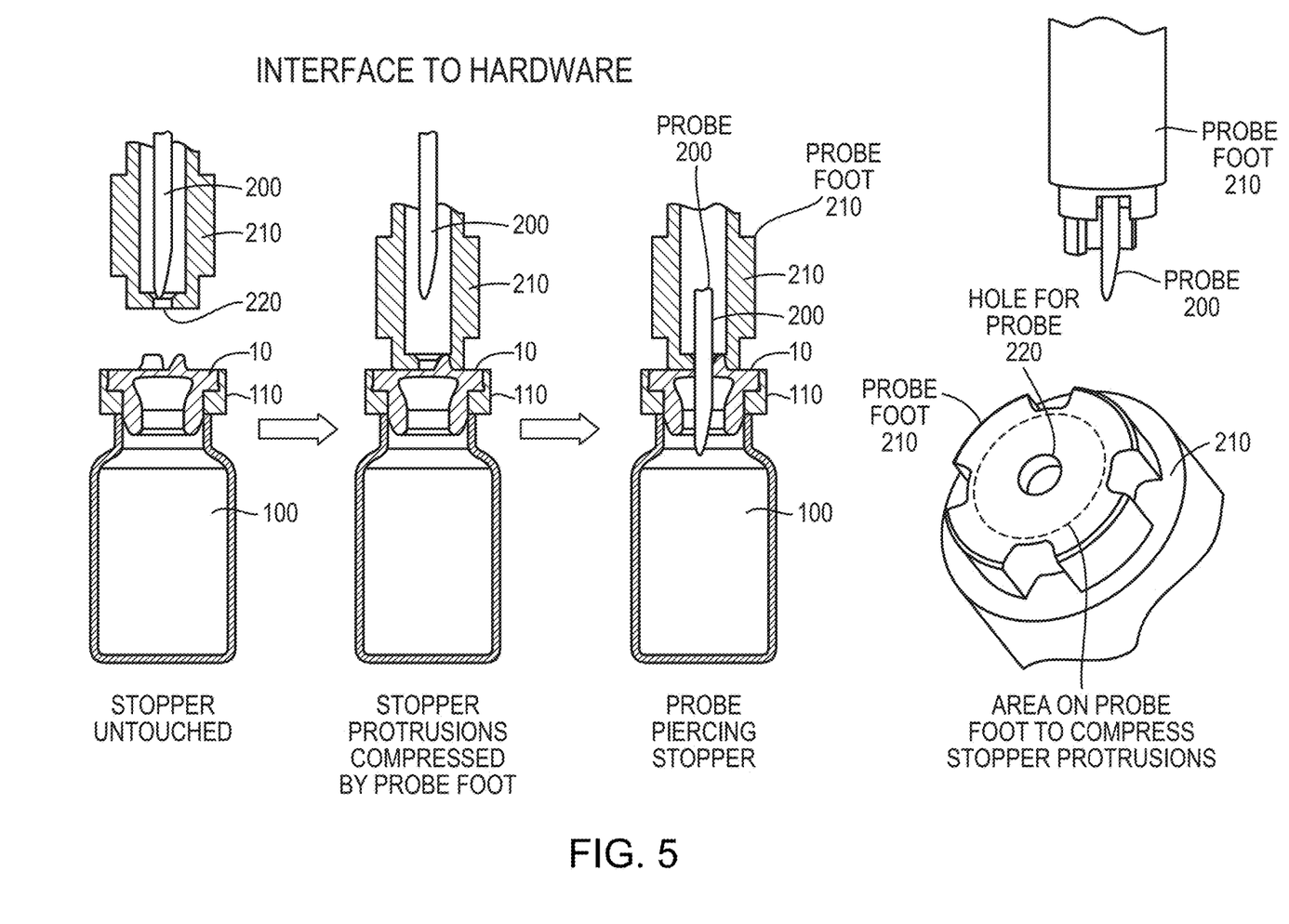
FIG. 5 is a diagram showing a process for piercing the disclosed stopper by an aspiration probe of an automated analyzer for aspirating a reagent from a reagent container according to an aspect of the present disclosure.

FIG. 5 is a diagram showing a process for piercing the disclosed stopper 10 by an aspiration probe 200 of an automated analyzer for aspirating a reagent from a reagent container 100. In a first state of the process, the aspiration probe 200 is in a retracted position within a probe foot 210 and the probe foot 210 is also in a retracted position such that the stopper 10 is untouched by the probe foot 210 or the aspiration probe 200. The probe foot is a substantially cylindrical member that sheathes the aspiration probe 200 and is configured for vertical movement independently of the aspiration probe 200. The probe foot 210 includes a hole 220 configured to allow the aspiration probe 200 to extend and retract therethrough.

In a second state of the process, the aspiration probe 200 remains in its retracted position and the probe foot 210 is extended downward onto the stopper 10 and cover member 110. The probe foot 210 in its extended position exerts a downward force on the protrusions 40 that compresses the protrusions 40 downward. Due at least in part to the undercut portion 80 of the internal cavity 50 the protrusions 40 roll inward toward the central axis 22 (FIG. 1) such that the top portions of the protrusions 40 are forced toward each other.

At the same time the base of the protrusions are also pushed away from the central axis 22 thereby applying a radial stretching force to the central area 69 of the stopper 10.

When the probe foot 210 is fully extended against the stopper 10 and cover member 110, the protrusions 40 are fully deflected toward the central axis 22. According to an aspect of the present disclosure, the disclosed geometry of the protrusions leaves a central clearance pathway between the top portions of the fully deflected protrusions 40.

Figure 6:
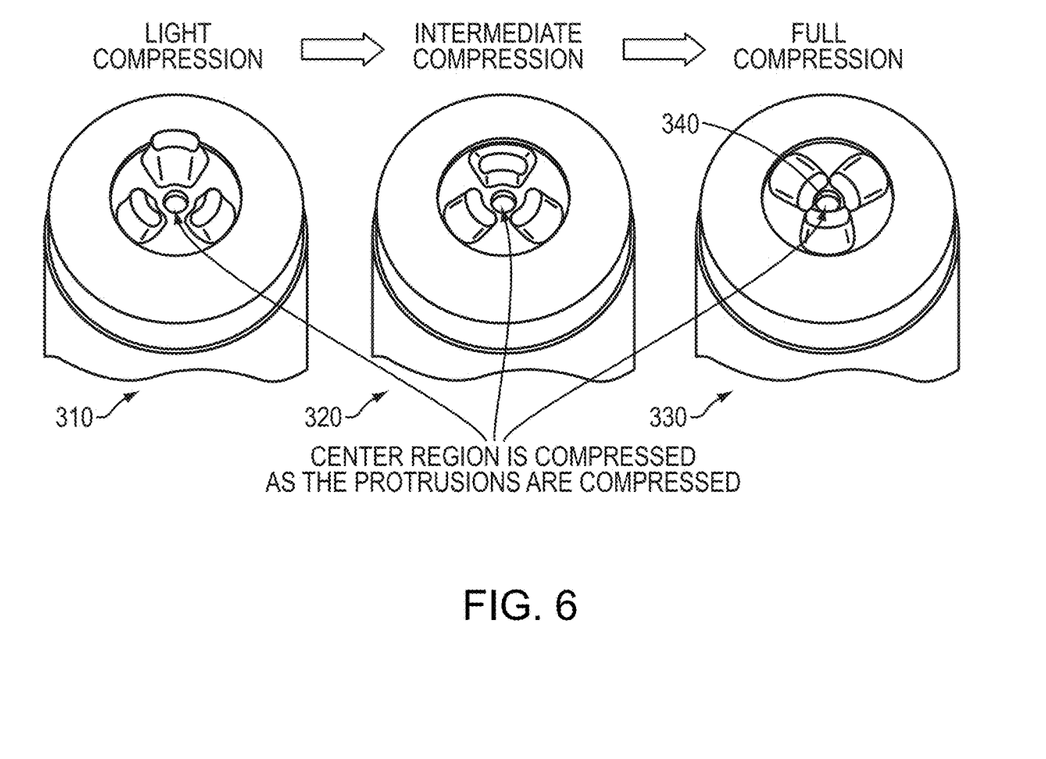
FIG. 6 shows a container stopper according to an aspect of the present wherein the disclosed protrusions of the stoppers are in a slightly compressed state, an intermediately compressed state and in a fully compressed state.

FIG. 6 shows the protrusions in a slightly compressed state 310, an intermediately compressed state 320 and in a fully compressed state 330. In the fully compressed state 330 the central clearance pathway 340 for is maintained for allowing the aspiration probe 200 to pass therethrough.

Figure 7:
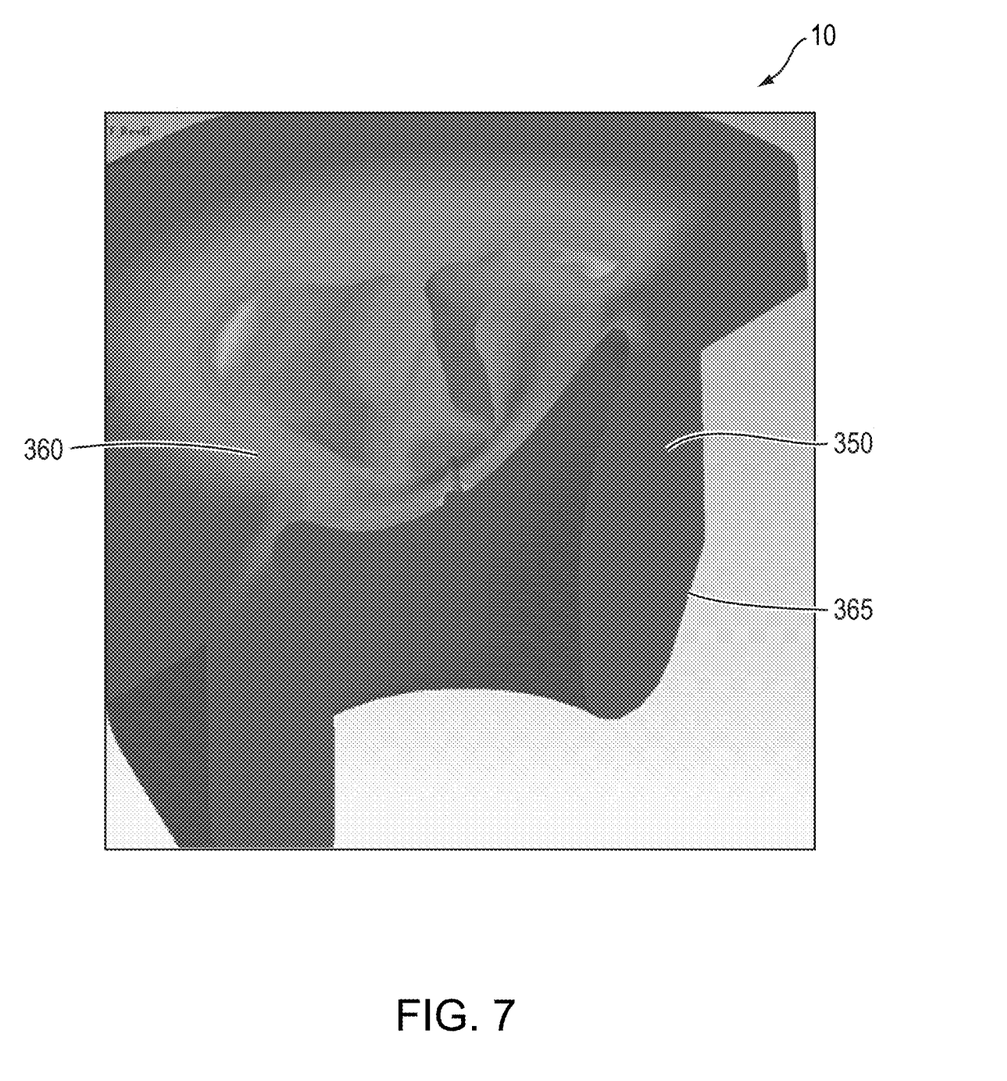
FIG. 7 shows a cross sectional finite element analysis view of the disclosed stopper according to an aspect of the present disclosure wherein when the protrusions of the stopper are in a fully compressed state.

FIG. 7 shows a cross sectional finite element analysis view of the disclosed stopper 10 when the protrusions 40 are in the fully compressed state. A dark colored region 350 around the central area 69 indicates stretching of the central area 69 which reduces forces needed for piercing the stopper 10 with an aspiration probe 200. In an illustrative embodiment, the stopper 10 includes a pre-existing hole 365 that is stretched toward a more open state by the radial stretching force on the central area 69. A light colored region 360 above the undercut portion 80 indicates that stress is relieved above the undercut portion which facilitates repeated flexing of the protrusions toward each other without causing cracks, tears or fragmentation of the stopper.

Referring back to FIG. 5, in a third state, the aspiration probe 200 is extended while the probe foot 210 remains in its extended position. The aspiration probe 200 pierces the central area 69 of the stopper 10 and extends into the reagent container while the central area 69 of the stopper 10 remains radially stretched. After the reagent is aspirated into the aspiration probe 200, both the aspiration probe 200 and the probe foot 210 are retracted to the first state to repeat the process.

Figure 8:
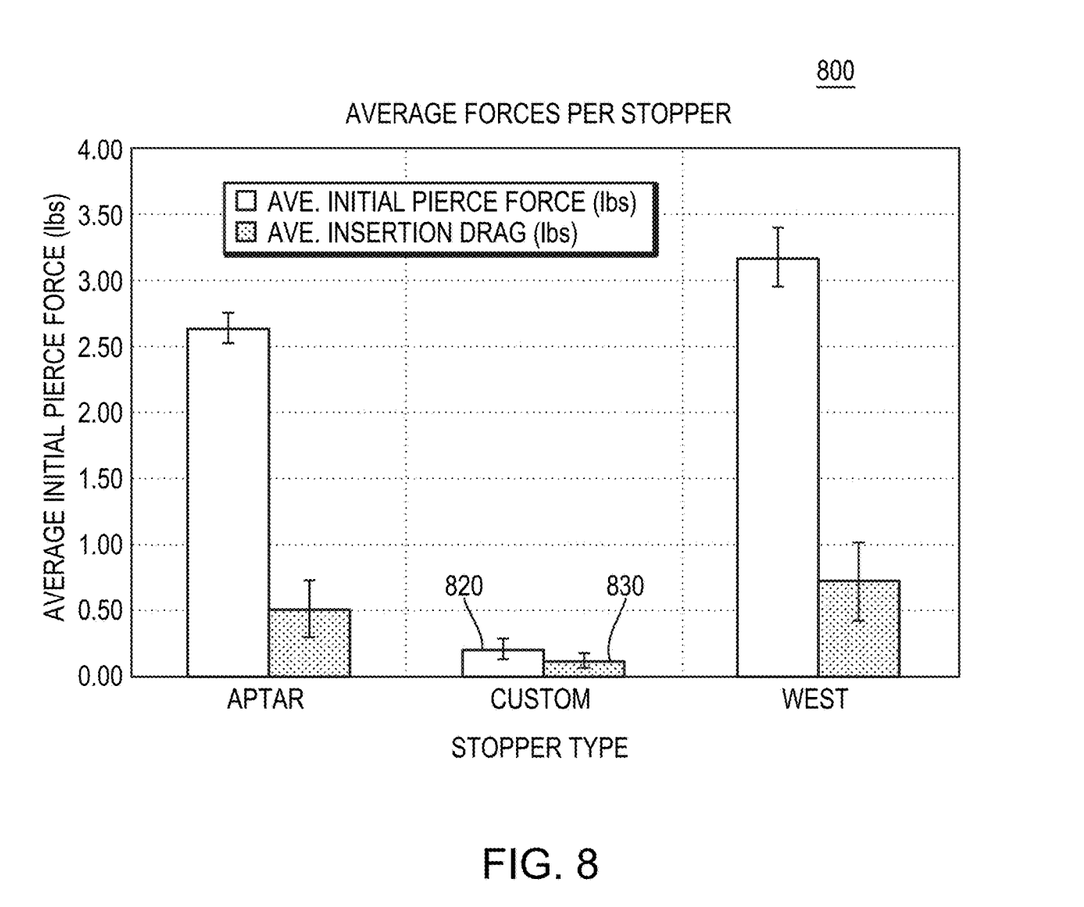
FIG. 8 is a graph showing a comparison of forces required for piercing the disclosed stopper by an aspiration probe versus forces required for piercing previously known container stoppers.

FIG. 8 shows a graph 800 comparing the average initial force 820 required for piercing the disclosed stopper 10 by an aspiration probe 200 and the average drag applied by the disclosed stopper 10 on the aspiration probe 200 compared to the same forces on two previously known reagent container stopper types. According to an aspect of the present disclosure, both the average initial insertion force 820 and insertion drag 830 of the disclosed stopper are drastically reduced compared to the previously known reagent container stopper types.

Although various aspects of the present disclosure are described in terms of a plurality of protrusions 40 extending upward from the top surface 71 of a reagent container stopper 10, it should be understood that alternative embodiments may implemented within the scope of the present disclosure. For example, in one alternative embodiment a reagent container stopper may be configured with a flat top surface without the protrusions. In the alternative embodiment one or more protrusions may be configured on the probe foot, instead of on the stopper as described above. The protrusions extending downwardly from a probe foot may be configured to stretch a central portion of the stoppers top surface. The alternative embodiment may include the same substantial undercut portion as the container stopper 10 described above. The protrusions from the probe foot may configured to act in conjunction with the undercut portion to reduce insertion forces, and drag on the aspiration probe and to provide increased durability of the stopper.

The invention claimed is:

1. A pierceable stopper for sealing a container opening, the pierceable stopper comprising:

a hollow plug portion defining a central axis;

a disk portion covering the hollow plug portion, the disk portion being concentrically, arranged with the hollow plug portion about the central axis and defining a flange extending radially beyond an outside diameter of the hollow plug portion;

the hollow plug portion comprising an internal cavity intersecting the disk portion such that the disk portion has a reduced thickness portion over the internal cavity relative to other parts of the disk portion;

the disk portion comprising a central area defining a pierceable membrane at the reduced thickness portion;

the pierceable stopper further comprising protrusions extending from a top surface of the disk portion over part of the central area and in a direction opposite the internal cavity; and the internal cavity having a first width at an end of the hollow plug portion farthest from the reduced thickness portion and a second width at an interior of the hollow plug portion, the second width being greater than the first width.

2. The pierceable stopper of claim 1, wherein the internal cavity comprises a curved portion extending radially into the flange portion.

3. The pierceable stopper of claim 1, wherein the hollow plug portion comprises a compressible exterior surface.

4. The pierceable stopper of claim 1, wherein the pierceable membrane comprises an elastic diaphragm.

5. The pierceable stopper of claim 1, made from a bromobutyl material.

6. The pierceable stopper of claim 1, comprising a siliconized outer surface.

7. The pierceable stopper of claim 1, wherein the protrusions are arranged in a circle in the central area of the disk portion.

8. The pierceable stopper of claim 1, wherein the container contains a reagent; and wherein the pierceable membrane is configured for piercing by a probe, the pierceable stopper being configured to allow the probe to reach the reagent in the probe.

9. The pierceable stopper of claim 8, wherein the pierceable membrane is configured to reseal following removal of the probe from the pierceable membrane.

10. The pierceable stopper of claim 1, wherein the stopper is configured to limit susceptibility of the pierceable stopper to at least one of fragmenting or coring in response to piercings by a probe.

11. The pierceable stopper of claim 1, wherein at least part of the pierceable stopper comprises a flexible material.

12. The pierceable stopper of claim 1, wherein part of the internal cavity has a curved cross-sectional shape.

13. The pierceable stopper of claim 1, wherein part of the internal cavity has a linear cross-sectional shape.

14. The pierceable stopper of claim 1, wherein a first part of the internal cavity has a curved cross-sectional shape; and wherein a second part of the internal cavity has a linear cross-sectional shape.

15. The pierceable stopper of claim 1, wherein a top of the disk portion that is opposite the hollow plug portion comprises multiple radial zones.

16. A system comprising:

the pierceable stopper of claim 1; and a reagent container having the container opening that is sealable by the pierceable stopper, the reagent container for holding a reagent.

17. The system of claim 16, further comprising:

a probe configured to pierce the pierceable membrane to aspirate at least some of the reagent from the reagent container;

wherein the probe comprise an outer part that sheathes an inner part, the inner part comprising a piercing cannula.

18. The system of claim 16, wherein a first part of the internal cavity has a curved cross-sectional shape; and wherein a second part of the internal cavity has a linear cross-sectional shape.

19. The system of claim 16, wherein the pierceable membrane is configured to reseal following removal of the probe from the pierceable membrane.

20. The system of claim 16, wherein the reagent container is associated with an automated blood analyzer.

* * * * *